United States Patent
Dickey

(10) Patent No.: US 6,470,693 B1
(45) Date of Patent: Oct. 29, 2002

(54) COMPRESSED AIR REFRIGERATION SYSTEM

(75) Inventor: James R. Dickey, Cornelius, NC (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/903,200

(22) Filed: Jul. 11, 2001

(51) Int. Cl.$^7$ .............................................. F25D 17/06
(52) U.S. Cl. .................. 62/90; 62/93; 62/402; 62/498
(58) Field of Search ............... 62/401, 402, 90, 62/93, 113, 115, 117, 467, 498, 509, 515

(56) References Cited

U.S. PATENT DOCUMENTS

| | | |
|---|---|---|
| 1,853,236 A | 4/1932 | Shadle |
| 3,041,842 A | 7/1962 | Heinecke |
| 3,585,808 A | 6/1971 | Huffman |
| 5,566,555 A * | 10/1996 | Hewitt ........................ 62/623 |
| 5,611,209 A | 3/1997 | Ogasawara et al. |
| 5,794,453 A | 8/1998 | Barnwell |
| 5,845,505 A | 12/1998 | Galus et al. |
| 6,170,270 B1 * | 1/2001 | Arshansky et al. ............ 62/81 |

* cited by examiner

Primary Examiner—William C. Doerrler
Assistant Examiner—Malik N. Drake
(74) Attorney, Agent, or Firm—Michael Best & Friedrich LLP

(57) ABSTRACT

A gas compressor refrigeration system including a chiller for cooling gas, a separator for separating condensate from the gas, and a reheater for heating the gas. The system also includes a closed refrigerant system which passes a charge of refrigerant in series, through a compression unit, then through the reheater in which the refrigerant exchanges heat with the gas, then through a condenser in which the refrigerant exchanges heat with ambient air, and then through the chiller.

14 Claims, 1 Drawing Sheet

COMPRESSED AIR REFRIGERATION SYSTEM

FIELD OF INVENTION

The present invention relates generally to gas compressors, and more particularly to refrigeration systems for gas compressors.

BACKGROUND OF INVENTION

A common problem when using a gas in an enclosed system is removing condensable material from the gas. Condensable material may lead to a variety of problems within the closed system if the material is left in the gas. A common method to remove condensable material from a gas is to cool the gas to a temperature below the condensation temperature of the condensable material, and then separate the condensed material from the gas. The substantially condensate free gas may then proceed through the system to its final application.

Removing condensable material from a gas is especially important for air compressors that must remove water vapors from the compressed air. Compressed air may experience several temperature changes within compressed air lines, and water vapors may form a liquid within the lines. Water vapors and liquid within compressed air lines may cause corrosion, reduce air pressure, clog filters, and lead to inconsistent air output. These problems can be substantially eliminated by removing the water from the compressed air before using the air in the final application.

Air compressors typically have a refrigerant system to lower the temperature of the compressed air to a temperature below the condensation temperature of water, such that condensed water can be removed from the compressed air. The refrigerant system passes a charge of refrigerant through an enclosed circuit that transfers heat from the compressed air to the refrigerant, and reduces the compressed air temperature. Elements of the refrigerant system generally include a chiller, a compression unit, a condenser, and a reheater. The chiller uses the refrigerant to lower the compressed air temperature to a temperature below the condensation temperature of water. The compression unit adds energy to the refrigerant. The condenser transfers heat from the refrigerant to ambient air, and lowers the temperature of the refrigerant. The reheater transfers heat from the refrigerant to the compressed air to warm the compressed air before it is discharged.

Prior art devices pass the refrigerant through a compression unit, condenser, reheater, and then a chiller in series. This arrangement adds energy to the refrigerant in the compression unit, and then removes that energy in the condenser soon afterwards.

SUMMARY OF INVENTION

The present invention includes an improved and efficient gas compressor cooling system for removing condensable material from a compressed gas. The cooling system comprises a gas system and a closed refrigerant system. The gas system includes a chiller for cooling the gas and forming a condensate, a separator for separating the condensate from the gas, and a reheater for reheating the gas. In the preferred embodiment, the compressed gas is air, and the condensate being removed from the air is water.

The gas system passes compressed air through a chiller, separator, and reheater in series to remove water from the compressed air. The chiller lowers the temperature of the compressed air to a temperature below the condensation temperature of water, and a condensate forms. The separator separates the condensed water from the compressed air. Finally, the reheater increases the temperature of the compressed air. In the preferred embodiment, the temperature of the compressed air exiting the reheater is higher than the inlet temperature of compressed air entering the chiller.

The refrigerant system preferably includes the chiller, a compression unit, the reheater, a condenser, a filter dryer, and an expansion device. A charge of refrigerant is passed through the compression unit, the reheater, the condenser, and the chiller in series. The compression unit adds energy to the refrigerant, and increases the pressure and temperature of the refrigerant. The reheater transfers heat from the refrigerant to the compressed air, and the condenser transfers heat from the refrigerant to ambient air. Preferably, the filter/dryer removes water and particulate matter from the refrigerant, and the expansion device lowers the pressure of the refrigerant. The chiller transfers heat from the compressed air to the refrigerant, and lowers the compressed air temperature below the condensation level of water.

The refrigerant passes through the reheater directly after passing through the compression unit, and before passing through the condenser. This arrangement utilizes the energy added to the refrigerant from the compression unit to maintain a high temperature for the refrigerant entering the reheater. The high refrigerant temperature increases the difference in temperature between the refrigerant and the compressed air entering the reheater. The large temperature difference creates a large heat exchange potential in the reheater, which improves the reheater efficiency, and allows a high compressed air discharge temperature.

Figure 1:
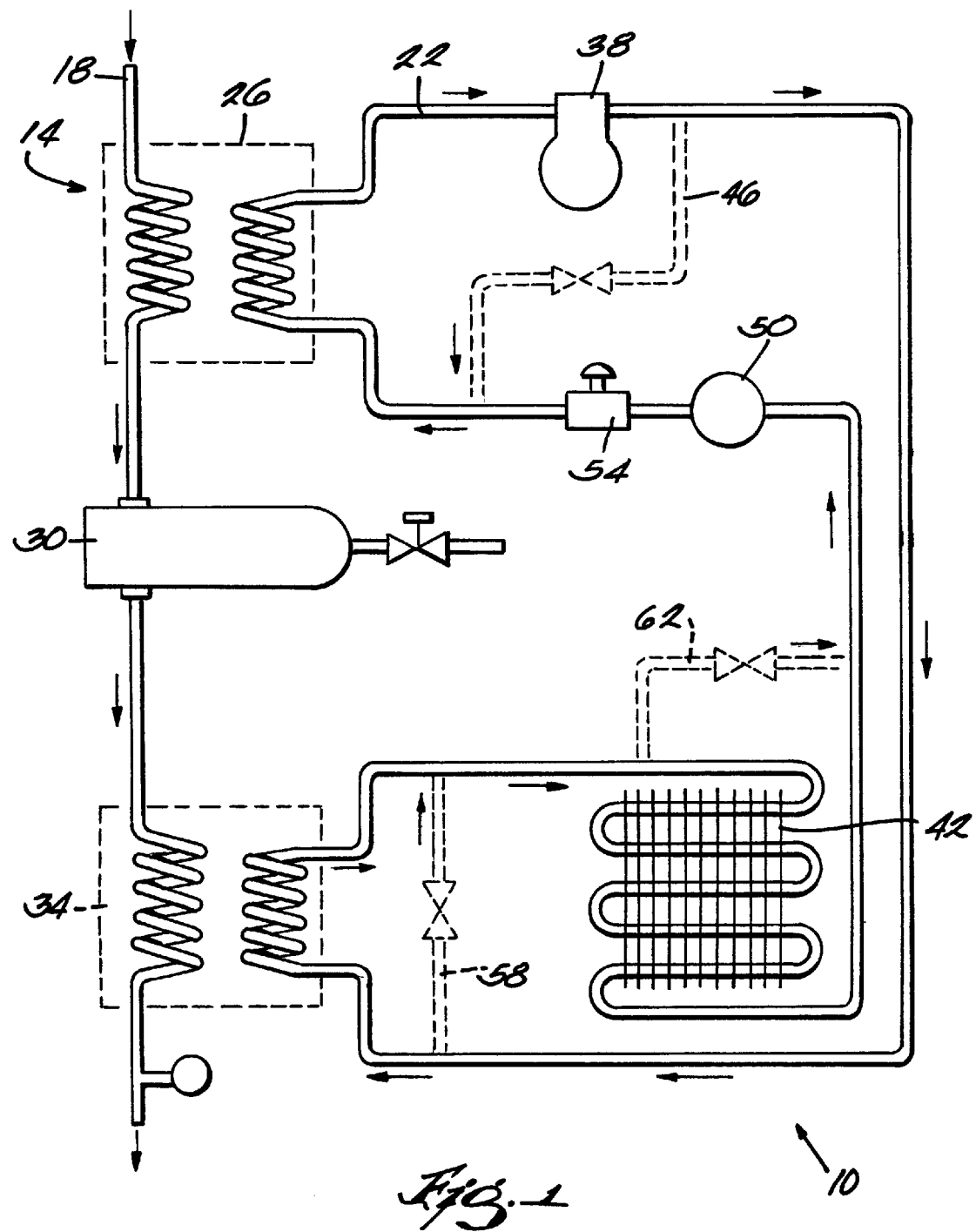
FIG. 1 is a schematic diagram of a refrigeration system embodying the present invention.

Before a preferred embodiment of the invention is explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a refrigerant system 10 for an air compressor embodying the invention. As illustrated in FIG. 1, the refrigerant system 10 is a closed cycle that is used to remove condensable material from compressed air in an air compressor. The air compressor includes two separate systems: a compressed air system 14, and the refrigerant system 10. Compressed air 18 passes through the compressed air system 14, and a refrigerant 22 flows through the refrigerant system 10. Heat exchangers are used to transfer heat between the compressed air 18 and the refrigerant 22. The refrigerant 22 is preferably R-134a when the refrigerant system 10 is used to remove water from compressed air 18.

The compressed air system 14 shown in FIG. 1 represents only a portion of an entire air compressor. The compressed air 18 passes through a chiller 26, a separator 30, and a reheater 34 in series. The chiller 26 is a heat exchanger that reduces the temperature of the compressed air 18. The compressed air 18 generally contains condensable material, such as water, and the water condenses and forms a condensate when the temperature decreases below the condensation temperature of the water. The compressed air 18 then enters a separator 30 in which the condensate is separated and drained from the compressed air 18. Finally, the compressed air 18 passes through the reheater 34 before continuing through the air compressor to a final application. The reheater 34 is a heat exchanger that transfers heat from the refrigerant 22 to the compressed air 18.

The refrigerant system 10 is a closed cycle in which the refrigerant 22 passes through the chiller 26, a compression unit 38, the reheater 34, and a condenser 42 in series. The refrigerant 22 first passes through the chiller 26 in which heat is transferred from the compressed air 18 to the refrigerant 22. The compressed air 18 typically enters the chiller 26 at approximately 100 degrees Fahrenheit, 100% RH, and 100 psig, and the temperature of the refrigerant 22 is substantially lower than the temperature of the compressed air 18. The chiller 26 condenses the condensable material in the compressed air 18, and may evaporate the refrigerant 22. Preferably, a relatively cool and low pressure gas refrigerant 22 exits the chiller 26 and proceeds to the compression unit 38.

The compression unit 38 adds energy to the refrigerant 22, and increases the temperature and pressure of the refrigerant 22. The compression unit 38 is preferably a conventional compressor, and may include a motor and piston or scroll compressor. Once the refrigerant 22 exits the compression unit 38, the refrigerant system 10 may have a potential hot gas bypass 46 that bypasses the remainder of the refrigerant system 10 and delivers the refrigerant 22 back to the chiller 26. However, the refrigerant 22 normally exits the compression unit 38 and proceeds to the reheater 34.

In the reheater 34, the hot, high pressure refrigerant 22 transfers heat to the dry compressed air 18. The temperature of the refrigerant 22 is reduced as it passes through the reheater 34, although the pressure remains substantially the same. The refrigerant 22 is preferably still a gas when it exits the reheater 34. Typically, the temperature of the compressed air 18 exiting the reheater 34 is approximately 140 degrees Fahrenheit. The refrigerant system 10 of the present invention will normally produce a reheater 34 discharge temperature of the compressed air 18 that is greater than the chiller 26 inlet temperature of the compressed air 18.

It should be noted that the refrigerant 22 passes through the reheater 34 before passing through the condenser 42. In prior art, the refrigerant 22 generally passes through a condenser 42 before passing through a reheater 34. The condenser 42 generally cools the refrigerant 22 by transferring heat from the refrigerant 22 to ambient air.

The thermodynamic effectiveness and efficiency of the reheating is maximized by increasing the temperature difference in the reheater 34 between the hot refrigerant 22 and the cold compressed air 18. The temperature of the refrigerant 22 is highest after flowing through the compression unit 38. Passing the refrigerant 22 through the reheater 34 directly after the compression unit 38, and before the condenser 42, provides a relatively high refrigerant 22 temperature entering the reheater 34. Having a high refrigerant 22 temperature also provides a large temperature difference between the refrigerant 22 and compressed air 18, which increases the heat exchange potential and improves heat transfer efficiency. In addition, having a high entering temperature for the refrigerant 22 at the reheater 34 also provides a high discharge temperature for the compressed air 18.

After exiting the reheater 34, the refrigerant 22 proceeds to the condenser 42. The condenser 42 is preferably a wire-on-tube or fin-on-tube heat exchanger that transfers heat from the refrigerant 22 to ambient air. The performance of the condenser 42 may depend on the load conditions of the compressed air 18. Under normal load conditions, the condenser 42 condenses the refrigerant 22 and exchanges heat with ambient air. Under lower than normal loads, the condenser 42 functions mainly as a refrigerant 22 cooler to greatly reduce the temperature of the refrigerant 22. Generally, the condenser 42 cools the refrigerant 22, and may condense the refrigerant 22 to create a liquid and gas mixture that exits the condenser 42.

The refrigerant system 10 preferably has a filter/dryer 50 and an expansion device 54 disposed between the condenser 42 and the chiller 26. The filter/dryer 50 removes water and particulate matter from the refrigerant 22. The refrigerant 22 is still at a relatively high pressure as it exits the filter/dryer 50 and continues to the expansion device 54. The expansion device 54 lowers the pressure of the refrigerant 22 to create a cold, low pressure, liquid and gas mixture before the refrigerant 22 returns to the chiller 26. Once the refrigerant 22 reaches the chiller 26, the cycle is complete, and the refrigerant system 10 is then repeated.

The refrigerant system 10 may have multiple bypass circuits to regulate the conditions within the refrigerant system 10. A reheater bypass circuit 58 may bypass refrigerant 22 around the reheater 34, and divert flow directly from the compression unit 38 to the condenser 42. A condenser bypass circuit 62 may bypass refrigerant 22 flow around the condenser 42, and divert flow directly from the reheater 34 to the filter/dryer 50. As mentioned above, the potential hot gas bypass circuit 46 may divert refrigerant flow directly from the compression unit 38 to the chiller 26, and bypass the reheater 34, condenser 42, filter/dryer 50, and expansion device 54. These bypass circuits may not be necessary for the present invention, but may be incorporated into the refrigerant system 10 to accommodate various conditions.

What is claimed is:

1. A gas compressor refrigeration system comprising:
   a gas system through which a gas passes, said gas system including in series,
      a chiller for cooling said gas,
      a separator for separating condensate from said gas, and
      a reheater for heating said gas;
   a closed refrigerant system which passes a charge of refrigerant in series,
      through a compression unit for compressing said refrigerant, then
      through said reheater in which the refrigerant exchanges heat with said gas, then
      through a condenser in which the refrigerant exchanges heat with ambient air, and then
      through said chiller.

2. The compressor of claim 1, wherein the temperature of said gas exiting said reheater is greater than the temperature of said gas entering said chiller.

3. The compressor of claim 1, wherein the temperature of said gas entering said chiller is approximately between 80 and 120 degrees Fahrenheit.

4. The compressor of claim 1, wherein the temperature of said gas exiting said reheater is approximately between 120 and 160 degrees Fahrenheit.

5. The compressor of claim 1, wherein the temperature of said gas exiting said chiller is approximately between 33 and 45 degrees Fahrenheit.

6. The compressor of claim 1, further comprising a filter/dryer disposed between said condenser and said chiller in said refrigerant system.

7. The compressor of claim 1, further comprising an expansion device disposed between said condenser and said chiller in said refrigerant system.

8. The compressor of claim 1, further comprising a potential reheater bypass circuit in said refrigerant system.

9. The compressor of claim 1, further comprising a potential condenser bypass circuit in said refrigerant system.

10. The compressor of claim 1, further comprising a potential hot gas bypass circuit in said refrigerant system.

11. A method for removing condensable material from a gas, the method comprising:

passing said gas in series through a chiller for cooling said gas, then through a separator to separate said condensable material from said gas, then through a reheater to heat said gas;

passing a charge of refrigerant in series through said chiller to cool said gas by absorbing heat from said gas, then through a compression unit to compress said refrigerant and add energy to said refrigerant, then through said reheater to exchange heat from said refrigerant to said gas, then through a condenser to exchange heat from said refrigerant to ambient air, then back to said chiller.

12. The method of claim 11, further comprising:

passing said refrigerant through an expansion device after passing through said condenser and before passing through said chiller.

13. The method of claim 11, further comprising:

passing said refrigerant through a filter/dryer after passing through said condenser and before passing through said chiller.

14. The method of claim 11, further comprising:

increasing the temperature of said gas exiting said reheater above the temperature of said gas entering said chiller.

* * * * *